(12) United States Patent
Stremsdoerfer

(10) Patent No.: US 9,284,645 B2
(45) Date of Patent: Mar. 15, 2016

(54) ELECTROLESS METHOD FOR IN-LINE METALLIZATION OF SUBSTRATES BY SPRAYING THEM, WITH PRIOR SURFACE TREATMENT AND DEVICE FOR IMPLEMENTING THE METHOD

(75) Inventor: Samuel Stremsdoerfer, Chaponost (FR)

(73) Assignee: Jet Metal Technologies, Saint Cyr Au Mount D'Or (FR)

( * ) Notice: Subject to any disclaimer, the term of this patent is extended or adjusted under 35 U.S.C. 154(b) by 1186 days.

(21) Appl. No.: 13/056,090

(22) PCT Filed: Jul. 30, 2009

(86) PCT No.: PCT/EP2009/059889
§ 371 (c)(1),
(2), (4) Date: Mar. 16, 2011

(87) PCT Pub. No.: WO2010/012810
PCT Pub. Date: Feb. 4, 2010

(65) Prior Publication Data
US 2011/0155444 A1    Jun. 30, 2011

(30) Foreign Application Priority Data
Jul. 30, 2008  (FR) .................................. 08 55262

(51) Int. Cl.
*B05D 3/08* (2006.01)
*C23C 18/16* (2006.01)
(Continued)

(52) U.S. Cl.
CPC ......... *C23C 18/1601* (2013.01); *C23C 18/1619* (2013.01); *C23C 18/1653* (2013.01); *C23C 18/18* (2013.01); *C23C 18/1803* (2013.01);
(Continued)

(58) Field of Classification Search
CPC .............. C23C 18/1662; C23C 18/166; C23C 18/1654; C23C 18/1658; C23C 18/1619; C23C 18/44; C23C 18/34; C23C 18/40; C23C 18/1617; C23C 18/1675; C23C 18/1683
USPC .................................................. 427/225, 223
See application file for complete search history.

(56) References Cited

U.S. PATENT DOCUMENTS 3,954,570 A * 5/1976 Shirk et al. .................. 205/118
4,217,182 A   8/1980 Cross ............................ 204/15
(Continued)

FOREIGN PATENT DOCUMENTS

CN   1622862   6/2005
FR   2 763 962  12/1998
(Continued)

OTHER PUBLICATIONS

Stremsdoerfer et al., "Copper Deposition by Dynamic Chemical Plating," 38 *J. Material Sci.* 3285 (2003).

*Primary Examiner* — Kelly M Gambetta
(74) *Attorney, Agent, or Firm* — James C. Lydon

(57) ABSTRACT

A method of metallizing the surface of a substrate electrolessly, by spraying one or more oxidation-reduction solutions thereonto. The steps of this method include: a) physical or chemical treatment to reduce the surface tension of the substrate before metallization; b) electroless metallization of the surface of the substrate treated in step a), by spraying one or more oxidation-reduction solutions in the form of one or more aerosols thereonto; and c) formation of a top coat on the metallized surface. Compact devices for implementing this method and the products obtained are also disclosed.

8 Claims, 3 Drawing Sheets

(51) Int. Cl.
  *C23C 18/18* (2006.01)
  *C23C 18/20* (2006.01)
  *C23C 18/31* (2006.01)

(52) U.S. Cl.
  CPC .......... *C23C 18/2006* (2013.01); *C23C 18/31* (2013.01); *Y10T 428/1317* (2015.01); *Y10T 428/31678* (2015.04)

(56) References Cited

U.S. PATENT DOCUMENTS

| | | | | |
|---|---|---|---|---|
| 4,975,305 | A * | 12/1990 | Biginelli | 427/354 |
| 5,348,574 | A | 9/1994 | Tokas et al. | 106/1.11 |
| 5,482,738 | A | 1/1996 | Imhof et al. | 427/305 |
| 6,268,016 | B1 | 7/2001 | Bhatt et al. | 427/98 |
| 6,391,385 | B1 * | 5/2002 | Holst et al. | 427/250 |
| 2004/0053066 | A1 * | 3/2004 | Cretekos et al. | 428/515 |
| 2004/0121595 | A1 | 6/2004 | Yoshitani | 438/678 |
| 2005/0208774 | A1 | 9/2005 | Fukunaga et al. | 438/745 |

FOREIGN PATENT DOCUMENTS

| | | |
|---|---|---|
| JP | A1994-220644 | 8/1994 |
| JP | A1999-335858 | 12/1999 |
| JP | A2000-129448 | 5/2000 |
| JP | A2000-129452 | 5/2000 |
| JP | A2005-264245 | 9/2005 |
| SU | 624888 | 9/1978 |
| WO | WO 98/54378 | 12/1998 |
| WO | WO9854378 A1 * | 12/1998 |
| WO | WO 00/20656 | 4/2000 |
| WO | WO 03/064061 | 8/2003 |
| WO | WO 2008/062070 | 5/2008 |

* cited by examiner

ELECTROLESS METHOD FOR IN-LINE METALLIZATION OF SUBSTRATES BY SPRAYING THEM, WITH PRIOR SURFACE TREATMENT AND DEVICE FOR IMPLEMENTING THE METHOD

TECHNICAL DOMAIN

The technical domain of the invention is that of coating of substrate surface by metallic films.

This invention involves non electrolytic metallization methods of substrates for decoration, for example applicable to the hollow glasses, to flasks, to cosmetic parts, to aeronautical parts, for the car and home electronics. This invention also envisages the non electrolytic metallization of substrates for electronics, specifically the execution of conductive tracks.

PRIOR ART

Technical Problem

The silvering of glass for the manufacture of the mirrors is one of the most ancient industrial applications of metallization by chemical means. Its method consists in using gravity to precipitate the metal, by immersion in baths of metallic solutions containing a metallic salt, a reducer and a complex-forming additive. The surface must be sensitized beforehand by application of an acidic solution of stannous chloride (SnCl2). This sensitization stage may be completed by an activation stage causing the intervention of an acidic solution of palladium chloride (PdCl2). These stages are expensive in energy, time and water plus the products used are hazardous. The technique of "classic" silvering presents in addition to numerous drawbacks and notably:

- glass is the only usable substrate,
- the surface of the substrate to be plated must be flat,
- the instability of the deposition baths,
- the deposition kinetics limited to 20 pm thickness per hour,
- the technical difficulty linked to the simultaneous co-deposition of different metals,
- the restricted spectrum of metals or alloys which may be deposited,
- the impossibility to obtain localized deposits,
- the perfectible character of the adhesion on the substrates of the metallic films deposited.

To remedy the problems relative to the non electrolytic metallization of substrates by immersion in baths of metallic solutions, FR-A-2 763 962 and the application for French patent filed under the number 06 10287 reveal a non electrolytic method of metallization of a substrate by projection of a spray containing a metal in cationic form (oxidant) and a reducer. In the perfected method, the activation stage of the surface is not compulsory and a prior wetting stage of the surface of the substrate permits improving the adherence of the film to the substrate. However, the optimization of the industrialization of the method and the improvement of the adherence performance of the film to the flat surface according to each substrate are still to be foreseen.

Otherwise, the document "Copper deposition by Dynamic Chemical Plating" published in 2003 in the "Journal of Materials Science", volume 38, pages 3285-3291, covered in the realization of printed circuits by chemical metallization (copper) of plastic substrates (PET, ABS or PVC). The metallic surface of the substrates to be plated is degreased and subject to a Corona treatment to increase the surface energy. The metallization is then performed by spray projection containing a metal in cationic form (oxidizer) and a reducer. No finish layer is applied on the metallization coating thus obtained. Such a method does not take into account either the constraints linked to the decorative aspect or those linked to the adhesion of the metallization layers on the substrates according to the nature of the aforesaid substrates and the nature of the metals deposited.

The technique of the silvering, developed above, has been adapted to decoration. US-A-4 975 305 describes a metallization method of articles, notably in plastic material, by projection that consists of:

- applying a first layer of monocomposite resin,
- drying,
- applying an acidic aqueous solution containing stannous chloride, rinsing,
- simultaneously projecting an aqueous solution of silver nitrate containing a ammoniac complex and an aqueous solution of reducing sugar,
- rinsing,
- and applying a finish varnish.

This method is implemented using a manual installation that does not permit an industrial adaptation of its metallization procedure. This technique does not give any satisfactory results concerning adhesion of the metallic films on the surface of the substrate because the method is implemented in an identical fashion whatever the substrate (plastic, metal, wood, polymer . . . ) and does not therefore adapt to the characteristics of each support to be plated.

Objectives

It would therefore be desirable to have an industrial method of metallization of the substrate surface by non electrolytic method and by projection of one or more oxide-reducing solutions that satisfies at least one of the following objectives:

- the method should encourage the adherence of the metallic film to the surface of the substrate,
- the method should be "clean", that means using some low or non toxic solutions or in very weak quantities and permitting the treatments of the effluents coming from the method,
- the method should be implemented using a compact installation incorporating it into currently used varnishing lines, for example length of active cabin from 1 m to 5 m, and to permit the treatment of the substrates on automated lines,
- the method should also adapt to every substrate with the goal to optimize to the maximum the adhesion of the film to the substrate and the decorative aspect,
- the method must permit obtaining some decorative coatings of several types (silver, copper, nickel . . . ) in line in traditional industrial lacquering installations,
- the method must permit obtaining a decorative metallic deposit characterized by "whitening" perfectly replacing the vacuum deposition of aluminum.

Another purpose of the invention is to supply a device for the implementation of the whole of such a method of on line metallization of substrates.

BRIEF DESCRIPTION OF THE INVENTION

However after long research the claimant discovered that a prior treatment of the substrate surface to plate permitted increasing the adherence of the metallic film to the substrate and specifically the decorative aspect.

That is why this invention has as its purpose a metallization method of the surface of a substrate characterized in which the following stages are implemented:
   a. physical or chemical reduction treatment of the surface tension of the substrate before metallization,
   b. non electrolytic metallization of the substrate surface treated in stage "a" by projection of one or several oxide-reducing solutions as aerosol(s),
   c. c. execution of a finish layer on the plated surface.

In stage 'a', the physical treatment is chosen advantageously either between the following treatments: a flame treatment, a corona treatment, a plasma treatment and their combinations; or between the following treatments: a flame treatment, a plasma treatment and their combinations.

By preference, the physical treatment of stage 'a' is flame treatment.

Besides, the physical treatment is advantageously a flame treatment and/or by plasma, when the substrate is a rigid substrate in plastic material, in composite material, in polymer or a flexible support in polymer, metal such as metal foil, textile or paper.

The flame treatment is, for example, the passage of the substrate to be metallized under a flame whose temperature is for example from 1200° C. to 1700° C. The duration of the flame treatment is generally from 4 to 50 seconds. The flame is by preference obtained by combustion of a fuel such as butane gas (or city gas) in presence of a comburant such as oxygen. The treatment (by) plasma corresponds, for example, to the passage of the substrate to be plated in a plasma torch, for example those marketed by Acxys® or Plasmatreat®.

In stage 'a', the chemical treatment is by preference chosen between the following treatments: application of a silane based solution, a depassivation of the surface using one or several acidic solutions, a polishing based on rare earth oxides, a fluoridation and their combinations.

In an even more preferential fashion, the chemical treatment of stage 'a' is an application of a silane based solution, a depassivation by projection of one or several acidic solutions, a fluoridation or their combinations.

Besides, this chemical treatment is more especially implemented when the substrate is a rigid substrate in hollow glass, metal or alloy.

A "depassivation" signifies for example that the substrate surface is corroded until elimination of the oxide layer covering it, by the action of a corrosive substance projected onto the substrate, such as a solution of strong acid, for example based on nitric, citric, sulfuric acid and their mixtures.

The "polishing based on rare earth oxide" signifies for example that a solution based on rare earth oxide is applied on the substrate to be plated and that the pads then polish the surface of the substrate, specifically by rubbing against its surface, until obtaining the elimination of a possible oxide layer presents on the surface and the smoothing of this surface.

By preference, the rare earth oxide based solution is a solution based on cerium oxide, that is for example the type marketed by the Polir-Malin® company under the name Glass Polishing®. By preference, the polishing based on rare earth oxide consists of a rinsing stage of the surface thus polished, specifically by distilled water.

Fluoridation corresponds for example to placing the substrate to be metallized in contact, in an enclosure under reduced pressure, with a gaseous solution based on inert gas (argon) containing a fluorine additive. According to the invention, fluoridation is carried out for example with an equipment of the type of those marketed by Air Liquide®.

The physical or chemical treatment of reduction of the surface tension of the substrate takes place preferably just before the "b" stage of metallization, without any intermediate stage. The duration between the 'a' and 'b' stages cannot exceed a few minutes. For example, the duration between the 'a' and 'b' stages must be less than 30 minutes, by preference less than 10 minutes and more preferentially the "b" stage must immediately take place after the 'a' stage.

In the 'b' stage of metallization, metal is advantageously chosen:
   either in the following group of metals: silver, nickel, tin, their alloys and their juxtapositions;
   or in the group of following metals: silver, nickel, tin, copper, their alloys and their juxtapositions; silver being especially preferred.

By "juxtaposition of metals", is designated for example in this exposition several metals not forming an alloy.

The oxide-reducer solution(s) of this 'b' stage, corresponding for example:
   either to only one solution containing at a time one or more oxidizers and one or more reducers,
   or to two solutions: the first containing one or more oxidizers and the second containing one or more reducers,
   or to a plurality of solutions each containing either one or more oxidizers or one or more reducers, under the condition that they at least have, one oxidizing solution and at least one reducing solution.

The 'c' stage may be advantageously a varnishing and/or a metallic electrolytic thickening.

In this exposition, the terms in the singular are also understood in the plural and reciprocally.

DETAILED DESCRIPTION OF THE INVENTION

Substrates:

In preferential conditions of implementation of the above described method, the substrate is a rigid substrate. This is chosen for example among the following compounds: glass, plastic materials, metals, the composite materials such as Acrylonitrile-Butadiene-Styrene copolymer charged with fiberglass, alloys and polymers. By preference, the rigid substrate is chosen between the following compounds: substrates in hollow glass, plastic materials, metals, composite materials such as Acrylonitrile-Butadiene-Styrene copolymer charged by the fiberglass, alloys and polymers. Especially preferred are the substrates in hollow glass and polymers.

In the sense of the invention, a substrate in hollow glass is a substrate in non flat glass, specifically a container in glass such as a flask or a bottle in glass.

In other preferential conditions of implementation of the method invention, the substrate is a flexible substrate. It is chosen for example between the following compounds: polymers, metals, textiles, metal foils and paper. By preference, the flexible substrate is a textile or a polymer film. For example, the flexible substrate is a polyethylene film with thickness is from 100 µm to 5 mm, a cloth or a sheet of paper with density from 50 to 600 g/m2.

In this invention, by flexible substrate is understood as a substrate that can be bent, bent by the strength of only a man without breaking or being damaged.

By contrast, in this invention, by rigid substrate is understood a substrate that cannot be curved, bent by the only strength of a man without breaking or being damaged.

Stage "a": Physical or Chemical Reduction Treatment of the Surface Tension:

According to one preferred mode of realization of the invention, the physical or chemical treatment for reduction of the surface tension of the substrate must be carried out so that the surface energy of the substrate is greater or equal to 50 or 55 dynes, by preference greater or equal to 60 or 65 dynes, and again more preferentially greater or equal to 70 dynes. Below these values, the wetting of the substrate is insufficient and the metallic coating obtained after metallization presents unsatisfactory features of adhesion, brilliance and reflectivity. The value of the surface energy, which is inversely proportional to the surface tension value, can be measured for example by techniques known to the expert in the art consisting of applying a specific solution on the substrate, using of a brush or a felt tip, and measuring the retraction of the solution thus applied.

As seen, the physical or chemical treatment of the surface of the substrate has the effect of decreasing the surface tension of the substrate and therefore increasing the wettability of this substrate by the solutions that are then projected. For example, the effect can come from a modification of the surface, that in the case of flame treatment signifies an oxidization and a creation of oxygen type bonds in the case of plasma.

When the substrate implemented is a substrate in hollow glass, the surface treatment is by preference a polishing with rare earth based oxide, specifically cerium.

When the substrate to be metallized is a plastic material or a polymer, the physical treatment of the surface is advantageously a flame treatment.

When the substrate to metallize is metal based, the chemical treatment by depassivation of the surface is recommended.

When the substrate to metallize is a flexible support, the surface treatment by flame treatment is preferred.

B Stage. Non Electrolytic Metallization:

In the method according to the invention, the stage of non electrolytic metallization includes, in order, at least the following stages:
  projection of one or several oxide-reducing solutions as aerosol,
  rinsing.

According to a first possibility, the non electrolytic metallization stage includes, in order, the following stages:
  wetting of the surface,
  projection of one or several oxide-reducing solutions as aerosol,
  rinsing,
  possibly drying.

According to a second possibility, the non electrolytic metallization stage includes, in order, the following stages:
  sensitization of the surface, by preference with a SnCl2 based solution,
  rinsing,
  projection of one or several oxide-reducing solutions as aerosol,
  rinsing,
  possibly drying.

According to a third possibility, the non electrolytic metallization stage includes, in the order, the following stages:
  sensitization of the surface, by preference with a SnCl2 based solution,
  rinsing,
  projection of a solution called "whitening activation",
  projection of one or several oxide-reducing solutions as aerosol,
  rinsing,
  possibly drying.

By "solution called 'whitening activation'", is understood a solution of metallic oxidizer defined below, diluted with a solution containing anionic, cationic or neutral surfactants.

Projection:

The oxide-reducing solutions used during the non electrolytic metallization stage are projected as aerosols on the substrate and are by preference obtained from solutions, advantageously aqueous, from one or several cation metallic oxidizers and one or several reducing compounds. These oxide-reducing solutions are obtained by preference by dilution of concentrated stock solutions. The diluent is by preference water.

It follows that according to a preferred provision of the invention, the aerosol(s) for projection are achieved by nebulization and/or atomization of solution(s) and/or of dispersion(s), in order to obtain a fog of droplets of size less than 100 µm, by preference 60 µm, and more preferentially again from 0.1 to 50 p.m.

In the method according to the invention, the projection of metallic solutions takes place by preference in a continuous manner and the substrate is placed in movement and is subjected to the projection. For example, when the metallic deposit is silver based, the projection is continuous. For a Nickel based metallic deposit the projection is done for example, in alternation with relaxation times.

In the invention method, the projection has a duration from 0.5 to 200 seconds, by preference from 1 to 50 seconds and more preferentially again from 2 to 30 seconds for a metallized surface of 1 dm2. The projection duration has an effect on the thickness of the metallic deposit and therefore on the opacity of this deposit. For most metals, if the projection duration is less than 15 seconds, the deposit is qualified as semi-transparent and if the duration of projection is greater than 15 seconds, the deposit is qualified as opaque. The substrate can be placed in rotation at least partially during the metallization projection.

Following a first projection method, are projected simultaneously onto the surface to be treated, in one or more sprays, one or more solutions of metallic cation(s) and one or more solutions of reducer(s) in a continuous manner. In this case in point, the mixture between the oxidizing solution and the reducing solution can take place right before the formation of the projection aerosol or again by fusion of a aerosol produced from the oxidizing solution and a aerosol produced from the reducing solution, by preference before entry in contact with the surface of the substrate to be metallized.

In accordance with a second projection method, one or more metallic cation solution(s) is projected successively, by means of one or more aerosols, then one or more reducer solutions. In other words, the projection of the oxide-reducing solution is done by separate projection(s) of one or more solutions of one or more metallic oxidizers and one or more solutions of one or more reducers. This second possibility corresponds to an alternated projection of the reducing solution(s) and the metallic salt(s).

In the scope of the second method of projection, the association of several metallic cation oxidizers to form a multi-layer of metals or different alloys, is such that the different salts are, by preference, projected of course separately from the reducer but also separately from one another and successively. It goes without saying that besides the different nature of metallic cations, it may be foreseen using different counter-anions between them.

According to one variant of the projection stage, it is done so that the mixture of the oxidizer(s) and the reducer(s) is metastable and, after projection of the mixture, this latter is activated so that the transformation into metal is released, by preference placement in contact with an initiator, advantageously contributed by means of one or several sprays, before, during or after the projection of the reaction mixture. This variant allows premixing the oxidizer and the reducer by delaying their reaction until they coat the surface of the substrate after projection. The initiation or the activation of the reaction is then obtained through any physical means (temperature, UV . . . ) or suitable chemical means.

Beyond the methodological considerations presented above and illustrated below in the examples, it is appropriate to give more precise information regarding the products implemented in the method according to the invention.

Water appears as the best adapted solvent, without excluding however the possibility of using organic solvents, for the production of the solutions starting from which the aerosols sprays will be produced.

The oxide-reducing solutions projected during the metallization stage of the substrate are one or more solutions of a metallic oxidizer and one or more solutions of a reducer.

The concentrations in metallic salts in the oxidizing solution to spray are from 0.1 g/l to 100 g/l and by preference from 1 to 60 g/l, and the concentrations in metallic salts of the stock solutions are from 0.5 g/l to 103 g/l, or the factor of dilution of the stock solutions is from 5 to 500. Advantageously, the metallic salts are chosen between silver nitrate, nickel sulfate, copper sulfate, stannous chloride, and their mixtures.

The selection of the reducers is made by preference between the following compounds: the borohydrides, dimethylaminoborane, hydrazine, sodium hypophosphite, formalin, lithium aluminohydride, the reducing sugars such as the derivatives of glucose or sodium erythorbate, and their mixtures. The selection of the reducer imposes considering the pH and properties envisaged for the metallization film. These routine adjustments are accessible to the man of the art. The concentrations in reducer in the reducing solution to spray are from 0.1 g/l to 100 g/l and by preference from 1 to 60 g/l, and the concentrations in reducer of the stock solutions are from 0.5 g/1 to 10 g/l, or the dilution factor of the stock solutions is from 5 to 100.

According to a particular provision of the invention, some particles are incorporated with at least one of the oxide-reducing solutions to be projected at the time of the metallization. The particles are thus trapped in the metallic deposit. These hard particles are for example diamond, ceramics, carbon nanotubes, metallic particles, rare earth oxides, PTFE (Polyterafluoroethylene), graphite, metallic oxides and their mixtures. The incorporation of these particles into the metallic film confers mechanical, tribological, electrical, functional and aesthetic properties specific to the plated substrate.

Rinsing:

Advantageously, the rinsing stage, that means placement in contact of all or part of the surface of the substrate with one or several sources of rinsing liquid, is carried out by spraying of a rinsing liquid aerosol, by preference water.

Drying:

The drying consists in the evacuation of the rinsing water. Advantageously it can be carried out for example at a temperature from 20 to 40° C. using a compressed air system pulsed at 5 bars/air pulsed at a temperature of 20 to 40° C.

Wetting:

The prior wetting stage evoked above consists in coating the surface of the substrate with a liquid film to encourage the plating of the oxide-reducing solutions. The choice of the wetting liquid is done in the following group: water either deionized or not, possibly complemented with one or several anionic, cationic or neutral surfactants, an alcoholic solution including one or several alcohols (for example isopropanol, ethanol and their mixtures), and their mixtures. Specifically, as wetting liquid, is chosen deionized water with an anionic surfactant and ethanol added. In a wetting variant according to which the wetting liquid is transformed into steam that is projected onto the substrate on which it condenses, it is preferable that the liquid is essentially aqueous for obvious reasons of industrial convenience. The wetting duration depends on the substrate surface considered and the projection flow of the wetting spray.

Sensitization:

According to one particular mode of embodiment of the invention, a sensitization stage of the substrate surface may be implemented by means of a sensitization solution, specifically stannous chloride, for example in accordance with the implementation mode described in FR-A-2 763 962. In this case, a rinsing stage using a rinsing liquid as described above is carried out just after the sensitization stage, without an intermediate stage.

According to one preferred mode of embodiment of the method, the non electrolytic metallization is silvering.

All modes of embodiment of the non electrolytic metallization in the sense of the invention are described more precisely in FR-A-2 763 962 and the application for French patent filed under the number 06 10287.

Whitening Activation:

According to a particular provision of the invention, a supplementary stage called "whitening activation" is implemented between the rinsing stage that follows the sensitization stage and the non electrolytic metallization phase. This stage consists in projecting a previously described "whitening activation" solution. The introduction of this stage in the method permits obtaining a very "white" coating, that means a coating whose reflectivity is homogeneous in the visible range. This type of coating essentially concerns the silver deposits, that naturally presents a yellowish color undesirable from the decorative view point. This whitening activation stage yields as a result a very white metallic deposit that perfectly substitutes the aluminum deposition under vacuum, while avoiding the handling constraints connected with placing them under a vacuum bell. This "whitening activation" stage encourages the molecular structuring of the coating which permits a good planarity and good homogeneity of the deposit. Executed thus, the metallization confers a good reflectivity to the substrate and a "whiter" aspect. This stage is followed by the projection stage of the oxide-reducing solutions of non electrolytic metallization described above. The duration elapsing between the whitening activation stage and the projection stage of the oxide-reducing solutions of non electrolytic metallization is by preference included between 1 and 30 seconds, by preference between 1 and 15 seconds.

C Stage. Execution of a Finish Layer:

According to a first mode of implementation of the method according to the invention, the 'c' stage is the application of a reticulatable liquid composition on the metallized surface, by preference a finish varnish. This varnish can be water-soluble or organic based, by preference water-soluble. It is chosen, according to the substrate, among the following compounds: alkyds, polyurethanes, epoxies, vinyls, acrylics and their mixtures. By preference, it is chosen between the following compounds: the epoxies, alkyds and acrylics and, more preferentially again, it involves an epoxy varnish. The reticulatable liquid finish composition can be reticulated by UV or baking and may contain the pigments for coloration. When the 'c' stage is the application of a reticulatable liquid composition, then, by preference, the drying sub-stage of the metallized surface may go ahead at the time of the non electrolytic metallization stage.

This execution stage of a finish layer can possibly be preceded by a projection stage of an adhesion primer in order to optimize the cohesion between the metallic layer and the varnish finish layer. The adhesion primer is by preference a silane based solution.

According to a second mode of embodiment of the method according to the invention, the 'c' stage of execution of a finish layer is the execution of an electrolytic thickening of the metallized surface. When the 'c' stage is the execution of an electrolytic thickening, then, by preference, no drying of the substrate surface is carried out in the non electrolytic metallization stage.

The electrolytic thickening is done by preference by immersion of the, at least partially plated, substrate in a bath of a solution of containing the electrolytes and by passage of a sufficient electric current between one electrode present in the electrolytic bath and the at least partially plated substrate. In the scope of the invention, the electrolytes are metallic ions capable of being deposited on the metallized surface of the substrate, for example chosen between ions of the following metals: nickel, silver or copper, as $Ni^{2+}$, $Ag^+$ and $Cu^{2+}$. The electrolytic thickening technique is well known to the person skilled in the art. For example, the amount of current necessary for the execution of a copper layer of 1 μm on a substrate having a metallized surface of 1 dm2 is from 0.5 to 20 A·secs, from a solution of $Cu^{2+}$ ions at 250 g/l. Generally, the thickness of the finish layer carried out by electrolytic thickening is from 2 to 40 μm. When the finish layer is carried out by electrolytic thickening, the substrate is by preference partially plated. The partial metallization is specifically possible by masking a part of the substrate surface before metallization.

In other preferential conditions of implementation of the invention, the substrate is submitted, prior to stage 'a', to the following stages:
surface coupling pretreatment of the substrate,
application of one or several layers of a base coating, by preference a varnish.

The surface coupling pretreatment of the substrate is for example a plasma treatment or flame or chemical treatment for reduction of the surface tension as described previously.

According to one individual mode of embodiment of the invention, the substrate is subjected, prior to stage 'a' either to a surface coupling pretreatment or to an application of one or several layers of a base coating.

For example, when the substrate coupling pretreatment is a fluoridation, it permits skipping the application stage of a base coating. The coupling pretreatment is essential when the substrate is for example polypropylene.

The base coating layer is by preference a water-soluble varnish or organic based, by preference water-soluble, chosen according to the substrate, among the following compounds: alkyds, polyurethanes, epoxies, vinyls, acrylics and their mixtures. By preference, it is chosen between the following compounds: epoxies, alkyds and acrylics and, more preferentially again, it involves an epoxy varnish. The base coating permits smoothing the surface of the substrate. The base coating may be reticulated by UV or baking and may contain pigments for coloration.

In the method according to the invention, the effluents coming from the different stages of the method are advantageously reprocessed and recycled to be reused in the method, and to limit the ecological impact.

In the above described method, the reprocessing and the recycling of the effluents includes, in order, at least the following stages:
recovery of the effluents, specifically from the waste waters, in a container,
distillation, by preference in an evaporator,
re-use of distillate it in the metallization method for example as rinsing water or as diluent of the oxide-reducing stock solutions, or dumping to the sewer.

In the above described method the reprocessing and the recycling of the effluents consist by preference, in order, the following stages:
recovery of the effluents, specifically of the waste waters, in a container,
possibly addition of a flocculant,
possibly decanting,
possibly separation of the filtrate and muds, specifically by filtration,
possibly neutralization of the filtrate, specifically elimination of ammonia, by addition of acid while controlling the pH,
distillation of the filtrate, by preference in a evaporator,
possibly passage over an activated charcoal system,
re-use of distillate in the metallization method for example as rinsing water or as diluent of the oxide-reducing stock solutions or dumping to the sewer.

The flocculant added to the effluents is by preference a charged organic polymer, such as those marketed by SNF Floerger®

The separation of the supernatant and the muds is done advantageously by filtration over frit, or by overflow.

The muds can then be evacuated and can be routed toward a specialized waste reprocessing or revalorization center.

The filtrate obtained can neutralized, specifically by addition of an acid solution of normality from 0.1 N to 10 N and until the filtrate reaches a pH from 5 to 6.

Acids used to neutralize the ammonia specifically present in the filtrate are chosen between hydrochloric acid, sulfuric acid, nitric acid and their mixtures.

The distillation of the filtrate is carried out by preference by means of an evaporator, and the filtrate is heated to a temperature from 90 to 120° C. The residue remaining at the bottom of the boiler at the end of distillation is evacuated to be routed to a specialized waste reprocessing or revalorization center. The distilled water can be reused in the metallization method, and specifically for the dilution of the stock solutions as well as for the rinsing and wetting stages.

The advantages of the method according to the invention are numerous. The surface treatment, specific to every type of substrate, permits controlling the metallization reaction and improving the adherence of the metallic film to the surface. The substrates obtained, and specifically the substrates obtained by metallization with silver, have a homogeneous reflectivity in the visible range (400-800 nm) and reflect all wave lengths, including in the blue. Such reflectivities were not attained by methods of the prior art. Further, the effluents rejected by the method, that represent, on an industrial scale, more than one ton per day, are reprocessed and reused in the method. Distilled water that comes out of the reprocessing module is pure and can be used for the dilution of the stock solutions of oxidizer and reducer, as well as for rinsing and wetting. This advantage is non negligible, on the one hand, from an economic point of view, because water consumption is significantly reduced and, on the other hand, from an ecological point of view, because the quantity of waste to evacuate is considerably decreased. It is important to note that industrial water may not be used in the method, and that a purification stage would be necessary if the method did not have a reprocessing module of the effluents and purification of the waste water. Besides, the method uses the concentrated stock solutions that are diluted right before metallization. The volume of stock solutions to transport is therefore less than if the solutions were already diluted, which decreases the costs, specifically of transportation.

Further, the quantities of reducer used are less than the authorized norm (ISO 14001), since this compound is toxic for the environment, the reduction of the quantities used represents an significant ecological advantage.

Besides, the electrolytic thickening carried out according to one individual mode of the invention, presents the advantage to be selective: it only takes place on the metallized surface of the substrate, which permits creating motifs plated in relief, such as conductive tracks.

This application also has the purpose of a substrates metallization method, as defined in the above description, in which a plurality of substrates are processed in line without breaking the chain. Specifically, the metallization method according to the invention requires no handling stage, aside from the stages of loading the substrate to be plated and unloading the metallized substrate.

The method described above is advantageously implemented by means of an industrial metallization device that consists of the following elements:
  a physical or chemical treatment module for reduction of the surface tension of substrates,
  a non electrolytic metallization module,
  a module for realization of a finish layer.

The module of physical or chemical treatment for reduction of the surface tension includes either a means of physical treatment of the surface chosen between the following means of treatment: a plasma torch or a flame treatment station, or a means of chemical treatment of the surface chosen between the following means of treatment: a fluoridation device, guns for the projection of chemical solutions or a polishing cabin. The fluoridation device is equipped with an enclosure under reduced pressure and means of projection a gaseous solution of inert gas (argon) containing fluorine, it can for example concern a device marketed by the Air Liquide® company. The polishing cabin consists of means of application of a solution based on rare earth oxides, for example the HVLP (High Volume Low Pressure) guns, of the polishing means, for example with rotary pads as well as the means of rinsing the surface thus polished, for example by the HVLP guns.

The non electrolytic metallization module consists of means of non electrolytic metallization that are the current means of projection of solutions, specifically those described in FR-A-2 763 962. These means of projection consist for example of a set of HVLP (High Volume Low Pressure) projection guns, said guns are each connected to one or several pumps fed with a solution. A first pump/gun system is planned for the wetting stage. A second pump/gun system is planned for the sensitization stage and a third for rinsing. A third pump/gun system may be planned for the stage called "whitening activation". The projection of the metallic solutions of oxidizer and reducer is done simultaneously using at least two pump/gun systems: one for the oxidizer solution and the other for the reducer solution. For the projection of the oxidizing solution, the number of guns is from 1 to 30 guns linked to at least one pump. It is the same for the projection of the reducer solution that has 1 to 30 guns. A last pump/gun system is planned for rinsing after the projection of the metallization solutions.

The non electrolytic metallization module can also consist of the means of drying of the metallic film, for example using a compressed air system pulsed at 5 bars/air pulsed at a temperature of 20 to 40° C.

The module for execution of a finish layer includes either the means of application of a reticulatable liquid finish composition, for example by the HVLP projection guns, or by the means of realization of an electrolytic thickening of the metallized surface, specifically an electrolytic bath filled with solution containing electrolytes, at least one electrode and a device permitting the circulation of an electric current.

The non electrolytic metallization module is equipped with a means of drying the metallic film by preference when the device according to the invention foresees a module for execution of a finish layer that consists of a means of application of a reticulatable liquid finish composition. When the module for execution of a finish layer is constituted of means of application of a reticulatable liquid finish composition, specifically a varnish, the device according to the invention then advantageously consists of a means of reticulation of the finish layer. These latter consist for example of thermal systems of infrared lamps or optical systems based on ultraviolet lamps. The reticulation temperature is from 10° C. to 300° C., according to the varnish used.

According to one preferred mode of embodiment of the invention device, the substrates to metallize are placed on a conveyor, for example belt and teeth, that allow their routing from one module to another. By preference, the conveyor is equipped with a means to rotate the substrates on themselves.

The device according to the invention includes, according to one preferred mode of embodiment, a pretreatment module of the surface that is constituted by means of surface coupling pretreatment as well as means of application of a base coating.

The means of surface coupling pretreatment of the substrate are the same as the means of physical or chemical treatment for reduction of surface tension described above.

The means of application of a base coating are for example the same as the means of application of a reticulatable liquid finish composition as described above and, besides, the device according to the invention may consist of means of reticulation of the base coating layer. These latter consist for example of thermal systems of infrareds lamps or optical systems to based on ultra-violet lamps. The reticulation temperature is from 10° C. to 300° C., according to the varnish used.

Besides, one of the preferred modes of embodiment of the invention is characterized in that the device according to the invention includes means of reprocessing and recycling the effluents.

The recovery of the effluents is done by preference by means of recuperation channels, such as baffles, that direct the effluents toward a recovery container, that have the purpose to protect the conveyor's mechanics on which the substrates to be plated are arranged.

The decanting and the separation of the filtrate and muds may take place by means of a decanter or an overflow device.

The distillation is carried out using equipment including one or more boilers and one or more refrigerated columns.

The purified water is routed toward the different modules of the method to be reused, by means of liquid routing, for example by pipes and pumps.

This invention also envisages a metallized substrate obtained by the method as described above, the substrate being for example specifically a hollow glass for cosmetic use, a car part, a part for home electronics or for aeronautics.

This invention also has the object of a metallized substrate obtained by the method as described previously, the substrate being specifically a part for such electronics as a conductive track, an RFID antenna (radio frequency identification) or electromagnetic shielding.

The invention will be understood better from reading the description that follows of implementation examples of the method and realization of the device concerned, in reference to the attached drawings on which:

FIG. 1 represents a summary diagram of the essential and optional stages of the method according to the invention.

FIG. 2 is a schematic representation of a device to carry out a method in conformity with the invention. This device consists of the following four modules:

Figure 1:
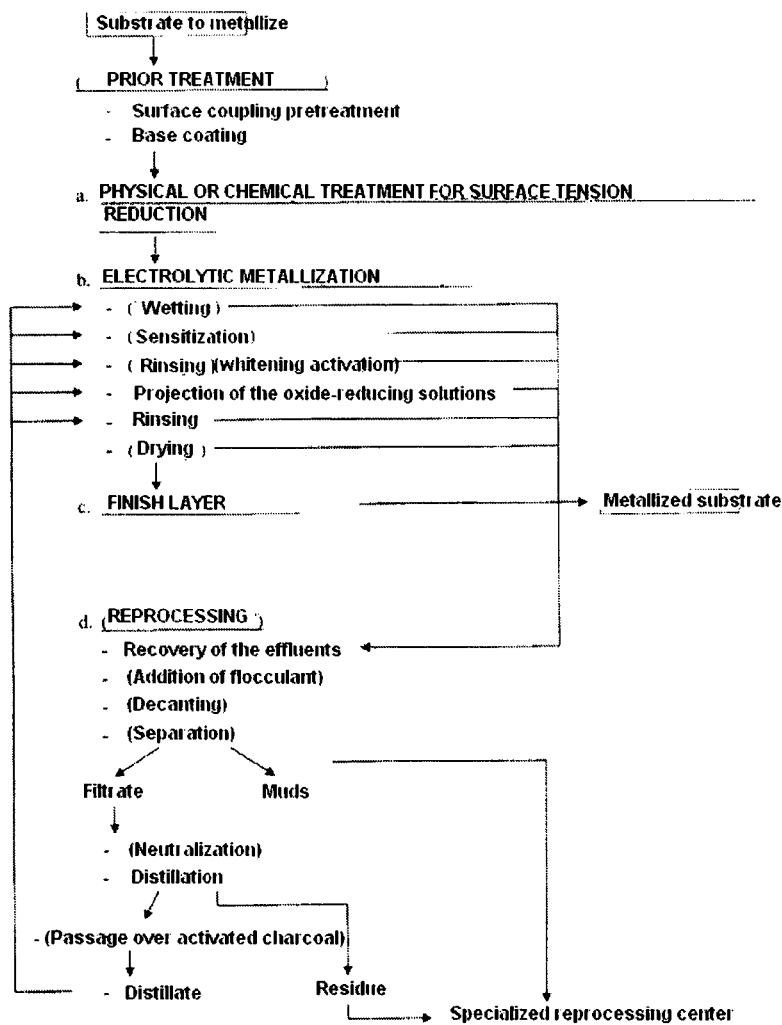
FIG. 1 represents an overall diagram of the method according to the invention.
Figure 2:
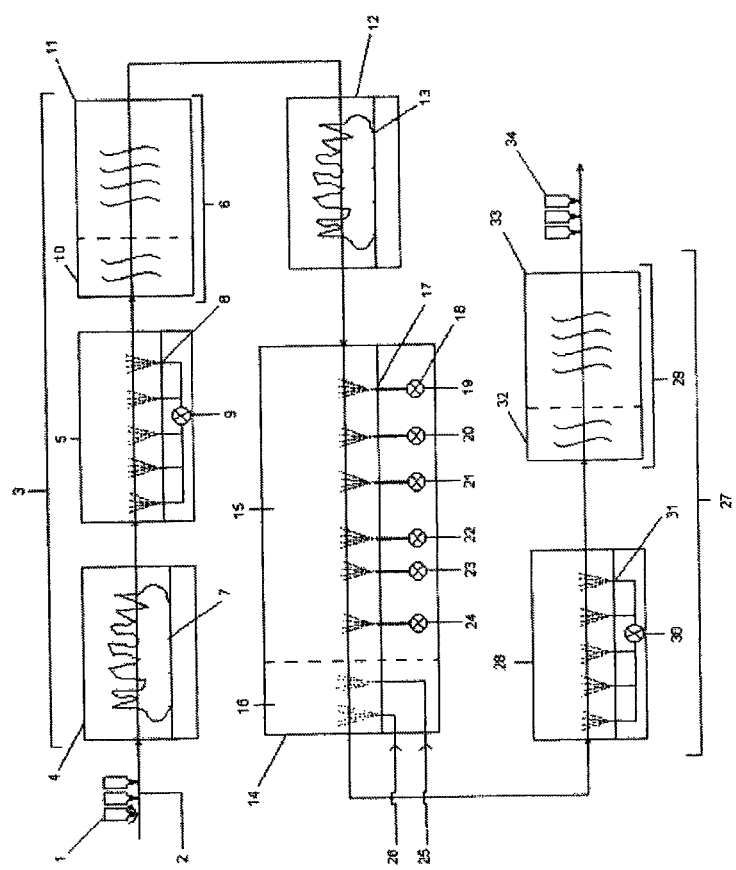
FIG. 2 represents a diagram of a device according to the invention.

an optional pretreatment module 3,
a physical or chemical treatment module for reduction of the surface tension 12,
a non electrolytic metallization module 14,
a module for execution of a finish layer 27.

The pretreatment module 3 consist of a surface coupling pretreatment cabin 4, a cabin for the application of a base varnish 5 and a cabin for varnish reticulation 6. The cabin for surface coupling pretreatment 4 is for example a flame treatment station provided with burners 7. The cabin for the application of a base varnish 5 is provided with guns 8 connected to a pump 9, itself connected to a reservoir of base varnish. The cabin for varnish reticulation 6 includes two zones: a first zone for the evaporation of the solvent using infrared lamps and a second reticulation zone 11 by UV/IR baking.

The module for physical or chemical treatment of surface tension reduction 12 is for example a flame treatment station provided with burners 13.

The non electrolytic metallization module 6 include two zones: a first called "projection" 15 and a second, optional, called "drying" 16. The projection zone 15 is equipped with guns 17 connected to pumps 18, each of the pumps 18 being connected to a solution bath that is specific to it. Pump 19 is reserved for wetting the surface. Pump 20 is planned for the sensitization stage of the substrate surface and pump 21 is for rinsing. Pumps 22 and 23 are pumps connected to the oxide-reducing solutions. Pump 24 is a rinsing pump.

The optional drying zone 16 is constituted by a compressed-air gun 25 pulsed at 5 bars then a gun 26 with pulsed air whose temperature is the order of 30° C.

The finish layer execution module 28 includes:

either a cabin for the application of a protective finish varnish 28, that is equipped with projection guns 31 connected to a pump 30, and a reticulation cabin of the protective varnish 29. The reticulation cabin of the protective varnish 29 includes two zones: a first zone for the evaporation of the solvent 32 using infrared lamps and a second reticulation zone 33 by UV/IR baking, or an electrolytic thickening cabin (not represented), constituted by a vat containing an electrolytic solution bath and electrodes between which sufficient current circulates to achieve an electrolytic thickening. One of the electrodes is immersed in the electrolytic solution bath and the other is connected to the metallized substrate.

During a method using this device, the substrate to metallize 1 is placed on a conveyor 2 which routes it toward the optional pretreatment module 3 in which it is first submitted to a surface coupling pretreatment in the cabin for surface coupling pretreatment 4, which is for example a flame treatment station. Then, the application of a base varnish 5 is carried out by projection in the cabin for base varnish application 5. The substrate thus varnished is then directed to the cabin for reticulation of the base varnish 6. The substrate thus pretreated is then routed to a physical or chemical treatment module for surface tension reduction 12. This physical or chemical treatment module for surface tension reduction 12 is for example a flame treatment station provided with burners 13.

The substrate is then directed to the metallization module 14 that is installed following the physical or chemical treatment module for surface tension reduction 12. In the projection zone 15, the pump 19 achieves the wetting of the surface, for example with water. Then the pump 20 projects a stannous chloride solution. This sensitization is followed of a rinsing stage, for example with water, by means of pump 21. Pumps 22 and 23 then project the oxide-reducing solutions necessary to the realization of the metallic film. Pump 22 is connected for example to the solution of metallic ions and pump 23 is connected to the reducer solution. The activation of these pumps can be simultaneous or consecutive. Following the metallization, a rinsing stage is foreseen by means of pump 24 connected to a rinsing liquid solution, for example water. The substrate then enters in the optional drying zone 16 where the compressed-air gun 25 pulsed at 5 bars then the pulsed air gun 26 whose temperature is the order of 30° C. induced the drying of the plated surface.

The thus metallized substrate is finally directed to the optional module for execution of a finish layer 19 in which the application of a protective finish varnish is achieved followed by its reticulation in the cabin for reticulation of the protective varnish 29. The substrate 34 metallized by the method according to the invention can be unloaded 5 after the reticulation of the protective varnish.

Figure 3:
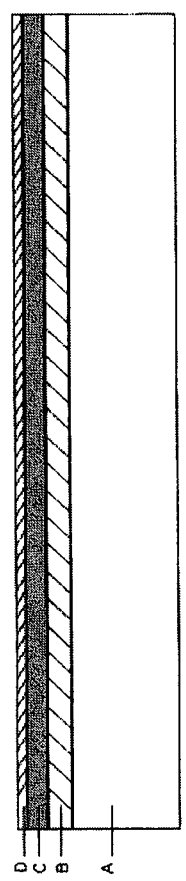
FIG. 3 represents a view in cross section of a substrate metallized by the method according to the invention.
Figure 4:
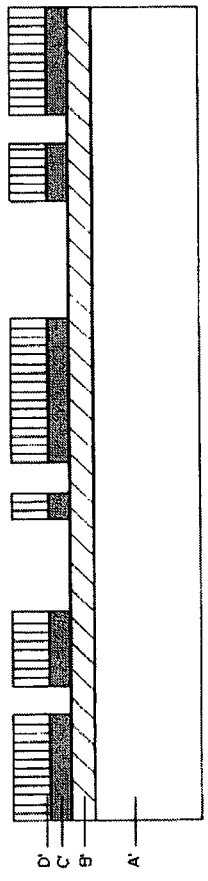
FIG. 4 represents a view in cross section of another substrate metallized by the method according to the invention.

The FIGS. 3 and 4 each represent a schematic view in cross section of a substrate metallized by one mode of embodiment of the invention method.

On FIG. 3, the plated substrate is constituted by 4 layers A, B, C and D. Layer A represents the substrate, for example a rigid substrate in glass. Layer B is the base varnish layer, for example an epoxy varnish marketed by the Akzo Nobel® company. Layer C is the metallic film, for example a silver film and layer D is the protective varnish, for example an epoxy varnish marketed by the Akzo Nobel® company.

On FIG. 4, the plated substrate is also comprised of 4 layers named A', B', C' and D'. A' represents a flexible substrate, for example a textile hardened in PVC. Layer B' is a base varnish, for example an alkyd varnish of the La Celliose® company. The C layer is the metallic layer, for example nickel, obtained by metallization with masking of a part of the surface. The layer D' is a layer of copper, that is the result of an electrolytic thickening in a bath containing copper sulfate. The deposition of this layer D' is selective and takes place solely on the surface of the C' layer

EXAMPLES

Example 1

Silver Metallization of a Rigid Substrate in Hollow Glass

A silane based solution at 0.1 g/l marketed by Degussa® under the name Glymo® is applied by projection by means of HVLP guns, on a cylindrical flask in glass, 10 cm in height and 5 cm outside diameter. An epoxy varnish marketed by Akzo Nobel is then projected, also by means of HVLP guns, on the flask in rotation. It is heated in a thermal enclosure at 280° C. for 10 minutes.

The flask is then placed in a flame treatment enclosure with three natural gas burners. The flask is rotated at a speed of 120 revs/minute. The flame temperature is adjusted to 1400° C. and the duration of the flame treatment is 20 seconds.

The flask thus treated is placed within a metallization device in which it is subjected successively to:
- a sensitization of the surface by projection, by means of HVLP guns, of a stannous chloride based solution for 5 seconds,
- a rinsing of the sensitization solution by water projection for 5 seconds, by means of HVLP guns,
- a projection of a solution called "whitening activation" on the basis of silver nitrate in aqueous solution to 10% containing an anionic surfactant for 8 seconds, by means of HVLP guns
- a projection of an aqueous solution of silver nitrate base at concentration of 2 g/l for 25 seconds simultaneously with a projection of an aqueous solution of hydrazine at 7 g/l, by means of HVLP guns,
- a rinsing to water for 5 seconds, by projection using HVLP guns,
- a drying by alternation of compressed air pulsed at 5 bars at ambient temperature and of air pulsed at normal pressure at 30° C.

The flask thus plated is varnished by projection, using HVLP guns, with an epoxy varnish of the La Celliose® company for 10 seconds. It is then heated in a thermal enclosure to 280° C. for 10 minutes.

A flask is thus obtained in silver plated glass.

Example 2

Silver Metallization of a Rigid Substrate in Hollow Glass

A cerium oxide based solution of 250 g/l marketed by Polir-Malin® under the name Glasspolishing® is applied by projection using HVLP guns, on a cylindrical glass flask, 10 cm in height and 5 cm outside diameter, then polished in a polishing cabin that consists of rotary pads and rinsed by projection of distilled water by means of HVLP guns.

The flask thus treated is placed within a metallization device in which it is subjected successively to:
- a sensitization of the surface by projection, by means of HVLP guns, of a stannous chloride based solution for 5 seconds,
- a rinsing of the sensitization solution by water projection for 5 seconds, by means of HVLP guns,
- a projection of an aqueous silver nitrate based solution of concentration of 2 g/l for 25 seconds simultaneously with a projection of an aqueous sodium gluconate based solution at 15 g/l, by means of HVLP guns,
- a rinsing with water for 5 seconds, by projection by means of HVLP guns,
- a drying by alternation of compressed air pulsed at 5 bars at ambient temperature and air pulsed at normal pressure at 30° C. The flask thus plated is varnished by projection, by means of HVLP guns, with an epoxy varnish of the La Celliose® company for 10 seconds. It is then heated in a thermal enclosure at 280° C. for 10 minutes.

A flask is thus obtained in silver plated glass.

Example 3

Metallization with Nickel/Copper of a Flexible Substrate Made of Polyester Cloth By projection by means of HVLP guns, is applied on a cloth made of polyester, the dimensions of which are 10 cm by 10 cm and thickness 2 mm, a polyurethane varnish marketed by the La Celliose® company. It is heated in a thermal enclosure at 40° C. for 40 minutes.

The cloth is then placed in a flame treatment enclosure with three natural gas burners. The varnished face of the cloth is subjected to flame treatment: at a flame temperature of 1400° C. for 20 seconds. The cloth thus treaty is placed within a metallization device in which the varnished face treated by flame treatment is submitted successively to:
- a wetting by water projection, by means of HVLP guns, for 5 seconds,
- a projection of an aqueous solution of nickel sulfate of concentration of 5 g/l for 30 seconds simultaneously with a projection of a sodium hypophosphite solution at 20 g/l, by means of HVLP guns,
- a rinsing with water for 10 seconds, by means of HVLP guns.

The textile thus metallized is immersed in an electrolytic bath of copper ions solution at 230 g/l. One electrode is placed in the bath and a current of 1 A is applied between the electrode and the substrate. The duration of the electrolysis is 720 seconds and the thickness is 20 microns.

A textile is thus obtained of nickel plated polyester and thickened with copper.

Example 4

Nickel Metallization of a Rigid Substrate in Polymer

A cosmetic container stopper, in ABS, of 3 cm diameter and with height of 2 cm, is subjected to a plasma treatment by means of a plasma torch marketed by Plasmatreat® under the Openair® reference.

The stopper, thus treated is placed within a metallization device in which it is subjected successively to:
- a projection of an aqueous solution of nickel sulfate of concentration of 5 g/l for 30 seconds simultaneously with a projection of a sodium borohydride solution at 20 g/l, by means of HVLP guns,
- a rinsing with water for 10 seconds, by means of HVLP guns,
- a drying by alternation of compressed air pulsed at 5 bars at ambient temperature and air pulsed at normal pressure at 30° C.

The stopper thus plated is varnished by projection, by means of HVLP guns, with an epoxy varnish of the La Celliose® company for 10 seconds. It is then heated in a thermal enclosure at 280° C. for 10 minutes.

A stopper is thus obtained in nickel plated ABS.

The invention claimed is:

1. Method of continuous surface metallization of a substrate wherein the following stages are implemented:
   a. physical treatment before metallization so that the surface energy of the substrate is at least 65 dynes to control a metallization reaction, said physical treatment having a duration of from 4 to 50 seconds, b. non electrolytic metallization of the surface of the substrate processed in stage 'a', by projection of one or more oxide-reducing solutions as aerosol(s), said metallization being performed less than 30 minutes after said physical treatment, to produce a metallized surface, c. execution of a finish layer on the metallized surface, said finish layer being a varnish or an electrolytic thickening of the metallized surface.

2. Method of metallization according to claim 1, wherein the physical treatment of stage 'a', is selected from the group consisting of a flame treatment, a corona treatment, a plasma treatment and combinations thereof.

3. Method of metallization according to claim 1, wherein the physical treatment of stage 'a' is selected from the group consisting of a flame treatment, a plasma treatment and combinations thereof.

4. Method of metallization according to claim 1, wherein the metal of the 'b' stage is selected from the group consisting of silver, nickel, tin, and alloys thereof.

5. Method of metallization according to claim 1, wherein the substrate is subjected, prior to stage 'a', to the following stages:

surface coupling pretreatment of the substrate, application of at least one layer of a base coating.

6. Method of metallization according to claim 1, wherein reprocessing and recycling of effluents is carried out coming from the different stages of the method and wherein the reprocessing and the recycling of the effluents consists of, in order, the following stages:

recovery of the effluents in a container, distillation in a evaporator, re-use of distillate in the metallization method or dumping in the sewer.

7. The method of claim 1, wherein a stannous chloride solution is applied to said substrate, after said physical treatment and prior to said non electrolytic metallization.

8. The method of claim 1, wherein said physical treatment comprises a flame treatment.

* * * * *